3 Sheets — Sheet 1.
J. H. MULLER.
Improvement in Rope Railways.
No. 125,210. Patented April 2, 1872.
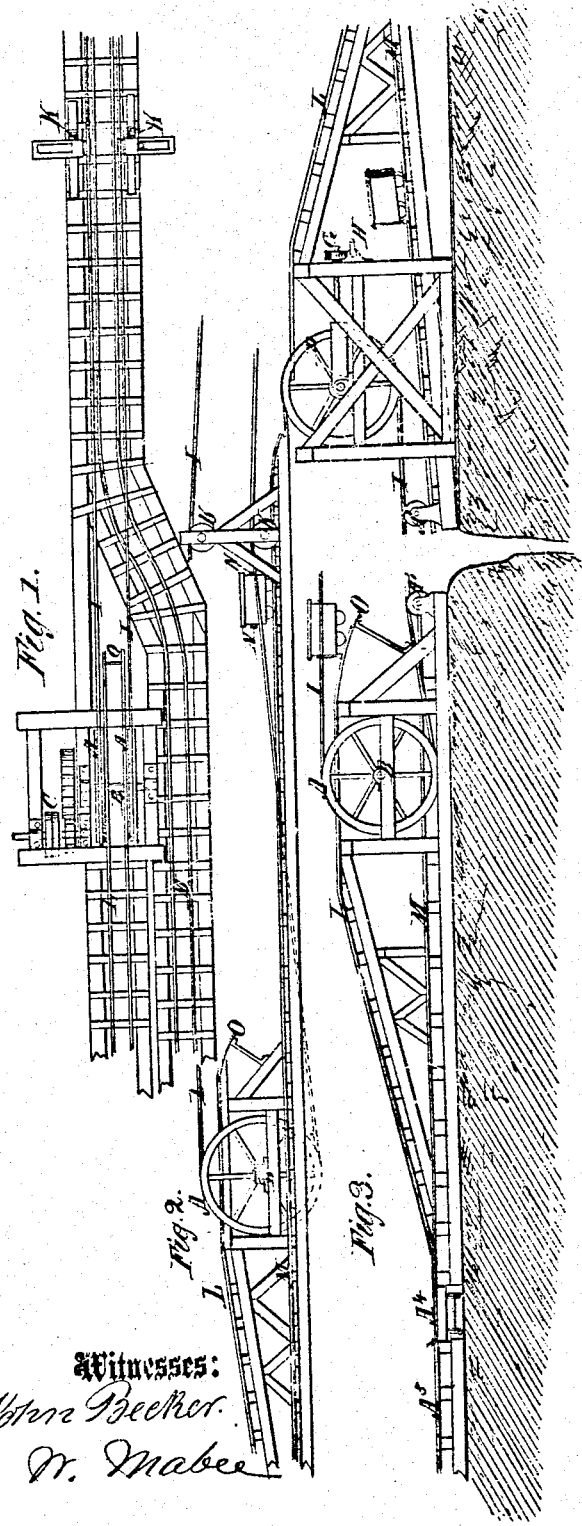
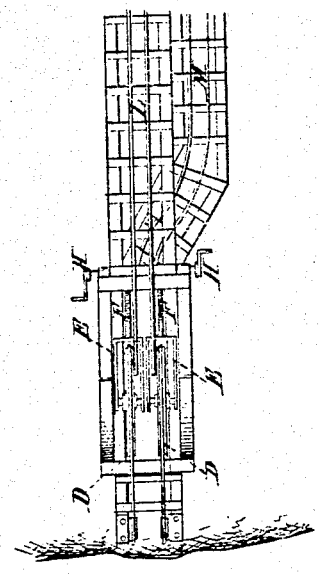
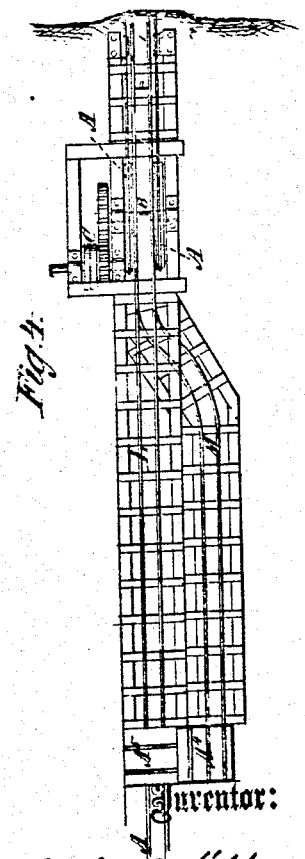
Witnesses:
John Becker
Geo. W. Mabee
Inventor:
J. H. Müller
per Munn & Co.
Attorneys.

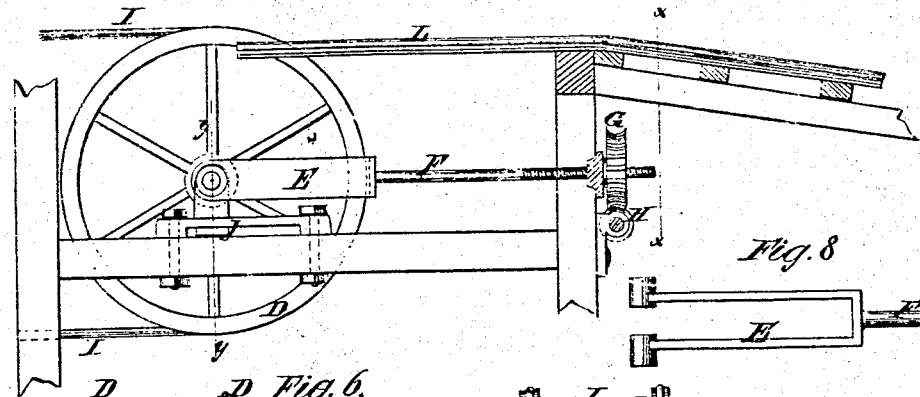
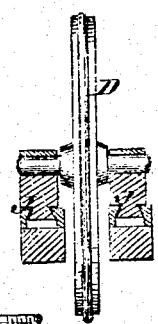
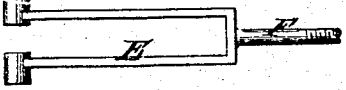
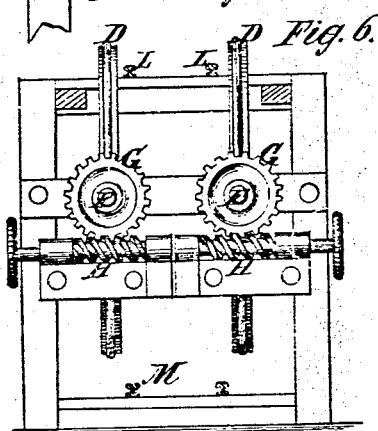
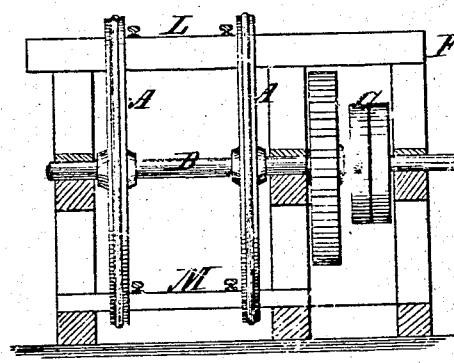
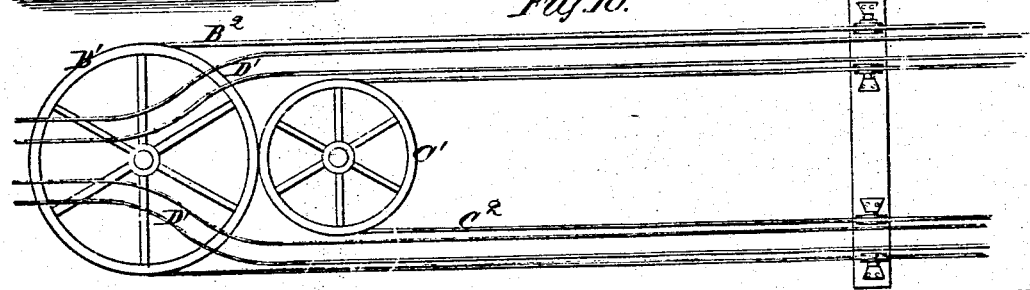
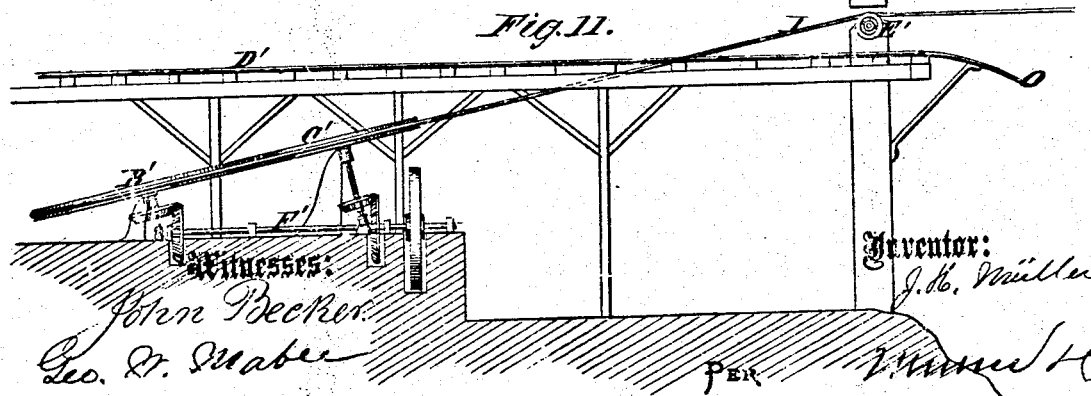
J. H. MULLER.
Improvement in Rope Railways.
No. 125,210.  Patented April 2, 1872.

3 Sheets. — Sheet III.
J. H. MULLER.
Improvement in Rope Railways.
No. 125,210. Patented April 2, 1872.
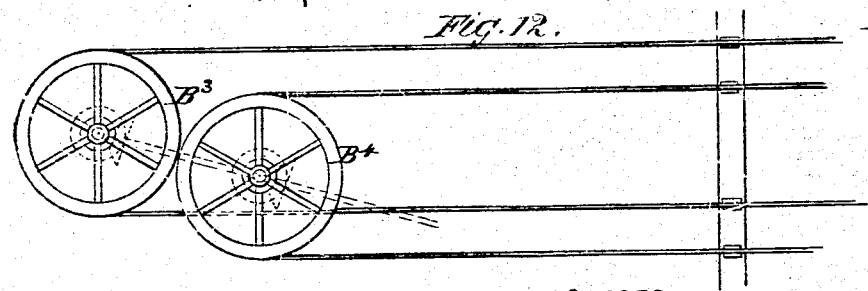
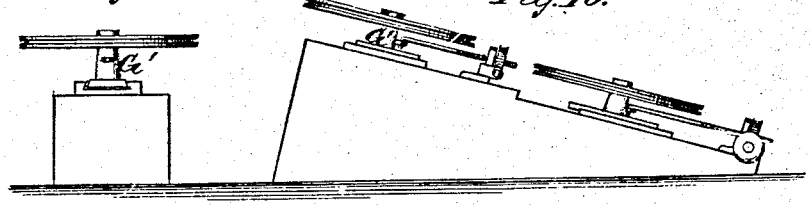
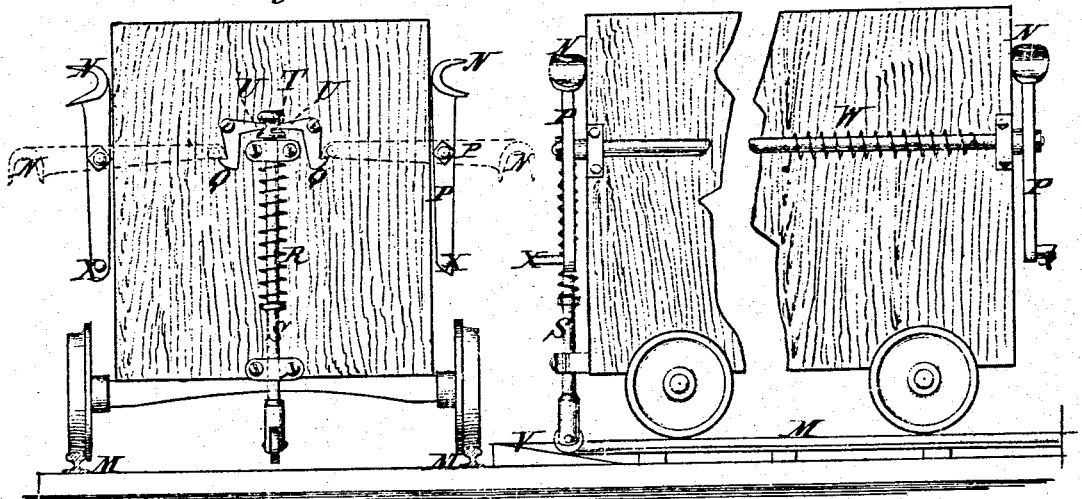
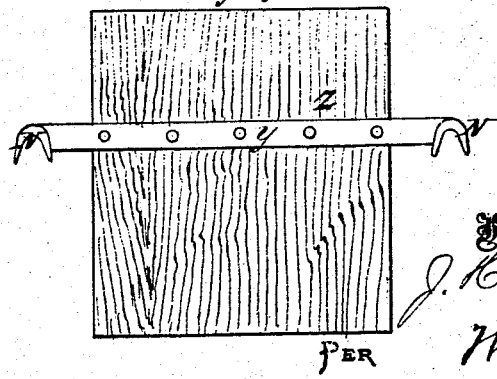
Witnesses:
John Becker
Geo. N. Mabee
Inventor:
J. H. Müller
per _____
Attorneys.

125,210

UNITED STATES PATENT OFFICE.

JULIUS HERMANN MÜLLER, OF VIENNA, AUSTRIA, ASSIGNOR TO FRANCIS FELBINGER, OF PITTSBURG, PENNSYLVANIA.

IMPROVEMENT IN ROPE-RAILWAYS.

Specification forming part of Letters Patent No. 125,210, dated April 2, 1872.

Specification describing a new and Improved Rope-Railway, invented by JULIUS H. MÜLLER, of Vienna, Austria.

The invention will first be fully described and then clearly pointed out in the claim.

Figure 1 is a plan view of a part of a section of the rope-railway and an ordinary railway connecting with it. Fig. 2 is a side elevation of the same, with a part broken out. Fig. 3 is a side elevation showing both ends of a section as when used for bridging a stream or other space. Fig. 4 is a plan of Fig. 3. Fig. 5 is a longitudinal section, showing the adjusting-pulleys and their adjuncts. Fig. 6 is a cross-section of Fig. 5 on the line $xx$. Fig. 7 is a partial cross-section on the line $yy$. Fig. 8 is a plan view of a yoke and adjusting-rod used for shifting the adjusting-pulleys. Fig. 9 is a cross-section through the permanent pulley-gear and the driving mechanism. Fig. 10 is a partial plan view of a section in which the two ways are arranged in the same horizontal plane. Fig. 11 is a longitudinal sectional elevation of Fig. 10. Fig. 12 is a plan of a modified arrangement of two ways in the same horizontal plane. Fig. 13 is a side elevation of the pulleys and adjusting gear of the modification of Fig. 1. Fig. 14 is an end elevation of Fig. 13. Fig. 15 is an end elevation of a car, showing the shifting-hooks and tripping gear. Fig. 16 is a side elevation of Fig. 15. Fig. 17 shows a plan for adapting heavy weights to be transported on the railway; and Fig. 18 shows a plan for transporting logs.

Similar letters of reference indicate corresponding parts.

A, Figs. 1, 2, 3, and 4, represents a pair of large vertically-rotating grooved pulleys, mounted on a shaft, B, arranged in fixed bearings, and gearing with any competent driving mechanism—say by a pulley, C—to be worked by a belt; and D represents similar pulleys to be placed at the opposite end of the section, but they are mounted on separate short shafts or yokes E, or it may be other supports adapted for shifting forward and back, for adjusting the tension of the endless ropes used for rails, as shown at J, Figs. 5 and 7, and provided with adjusting-screws F, which may have screw-nuts G with worms H for turning them to effect the adjustment, or any other adjusting apparatus may be used. These pulleys carry the parallel ropes I, which constitute the rope-railway, and answer for the rails of the ordinary road, and besides they constitute the means for transmitting the propelling power of the cars. The said ropes are stretched across any space—say a river, morass, chasm—or any place where it would be difficult and expensive to construct a permanent way, and will have intermediate supporting pulleys K wherever needed to prevent sagging too much. Two endless ropes thus arranged constitute a double track or way, one part of which moves in one direction at the top of the pulley, and another part at the bottom moves the reverse of the top, so that cars or weights may be carried in both directions at once. With these endless movable rails I connect an upper and lower section, L M, of the permanent way, as in Figs. 1, 2, 3, 4, or lateral branches, as at Fig. 10, at each end, as shown, when cars are to be run on them, as from a mine, to cross a river and off again, the said permanent ways running between the ropes below them, and gradually descending, so that hooked arms N P on the cars projecting outward laterally from the sides will be received on said ropes and suspend said cars so as to take them off the permanent rails, and at the other end will ascend in the direction the car moves, and will receive the wheels and gradually raise the cars off the ropes, all of which will be accomplished automatically. At the side where the cars are received the rails of the permanent way will descend considerably, as indicated at O, to insure the receiving of the car, no matter how much the rope may sag, or they may be so arranged at both sides. The returning empty cars will, preferably, be run over the highest part of the way, and the loaded ones over the lowest part. The two sections of permanent way at each end will, of course, have to be in the same vertical plane where they connect with the ropeway, but cannot be so where the upper part descends, so that one or both will have to be curved. I prefer to curve the lower one, as here shown, but this is not material. In Figs. 1 and 2 this curve is arranged beyond the main-rope pulleys, so that the car does not have to pass between said pulleys; consequently its hooks may be fixed on rigidly-projecting arms; but when arranged as shown in Figs. 3 and 4, where the curves are arranged in advance of said main-rope pulleys, and passes between them, such rigidly-projecting arms would not pass between said pulleys, for in order to be taken upon the ropes they must project slightly beyond them. Therefore I arrange the hooks N on arms P, Figs. 15 and 16, pivoted to the car, so as to swing up against the side of the car out of the way of the wheels when required to pass between said pulleys, and to swing down again after and to engage the rope, when they will be held by catches Q, with which the said arms engage automatically, when swung down by the action of the spring R and a rod S, the said catches being engaged, by arm U, with the rod by a groove, T, in the upper end, and the rod S being capable of rising and falling in its supports and forced down by the spring after being lifted by the arms in passing the catches. This rod is extended nearly to the ground and provided with a roller in the lower end to run up an incline, V, fixed in its path just before the car passes between the pulleys for tripping the arms automatically. The said arms are thus automatically turned up against the side of the car by a spring, W, coiled around the rod on which they are pivoted. They are turned back again to the horizontal position by being provided with a hand-crank pin, X, for the purpose. These branches L M may come together by an ordinary switch, or a transfer-car, $A^3$, on a short cross-track, $A^4$, may be used for shifting the car from the main trunk, $A^5$, to either branch, or vice versa.

In case of weights that may be lifted off and on the ropes readily, a single bar, Y, with two hooks, N, rigidly connected to the weight Z may be used; or when logs $Z^1$, Fig. 18, are to be transported, notched cross-pieces $Z^2$ may be placed on the ropes, and receive the log in a notch in the upper side.

I do not propose to limit myself to the particular arrangement of automatic catching and tripping apparatus here shown, for I may employ any that will accomplish the same objects, or I may fasten the arms in the horizontal position, and release them by hand.

In case it is not convenient to have the lower permanent ways M descend as the upper ones do at O, to deliver the car on the ropes, the latter may be caused to ascend by guide-pulleys $A^1$, Fig. 3.

In Figs. 10, 11, and 12 I have shown how the two ways may be arranged in the same horizontal plane in two arrangements slightly differing from each other.

In one case large wheels, $B^1$, are used for the ropes $B^2$, which constitutes the outside rail or rope for both ways, and smaller wheels $C^1$ for the ropes $C^2$ constitute the inside rail or rope, the smaller wheels being placed inside of the two parts of rope $B^2$, and being as much less in diameter as twice the width of space between the ropes of one way or track. The smaller wheels will be turned as much faster than the larger ones as required to give equal speed to the rims carrying the ropes. These wheels will be placed in an oblique plane, as shown in the sectional view, Fig. 11, under the permanent tracks D′, passing over them, and the ropes will ascend to a sufficient height above them to take the cars by passing over guide-pulleys E′. The said wheels will be geared to a driving-shaft, F′, at the end of the section where the power is applied as shown in Fig. 11, but at the other end they will be mounted separately on studs or supports G′ of any kind capable of sliding forward and back for adjusting the tension of the rope, and provided with adjusting-screws and nuts, as in the case of wheels D.

The modification represented in Fig. 12 differs from the above-described plan only in the use of wheels $B^3$ and $B^4$ of equal size, but so arranged that one laps over one part of one of the ropes, so that each rope constitutes one outside and one inside rope of each way.

This plan of endless-rope railway may be employed with good results for long lines made up of sections of suitable length, but it is more particularly intended for crossing places over which it is difficult to build permanent ways.

Having thus described my invention, I claim as new and desire to secure by Letters Patent—

1. The combination, with the endless-rope railway, consisting of two parallel endless ropes, I I, arranged on the grooved driving-wheels A D, and guiding and supporting wheels K K, of the permanent railway, and of cars provided with the pivoted suspending hook-bars and the tripping device, as shown and described.

2. The worm-shafts H H, wheels G G, and yokes E E, provided with screw-shanks F F, in combination with the driving-wheels D D, having sliding journal-blocks, all arranged as specified.

3. The combination, with said rope-railway, of sections of ordinary permanent railways, arranged for running the cars from one onto the other, substantially as specified.

4. The combination, with the cars for endless-rope railways, of shifting suspending-arms P, whether having automatically-turning, catching, and tripping apparatus or not, all substantially as specified.

5. The catches Q, rod S, spring R, and inclines V, combined with the hooked arms N P, substantially as specified.

The above specification of my invention signed by me this 2d day of October, 1871.

JULIUS HERMANN MÜLLER.

Witnesses:
WILLIAM HIMING,
WILHELM H. C. SCHMIDT.